United States Patent [19]

McGinnity

[11] Patent Number: 5,730,105
[45] Date of Patent: Mar. 24, 1998

[54] IDLE CONTROL FOR INTERNAL COMBUSTION ENGINE

[75] Inventor: Francis A. McGinnity, Hartland, Wis.

[73] Assignee: Outboard Marine Corporation, Waukegan, Ill.

[21] Appl. No.: 733,159

[22] Filed: Oct. 17, 1996

[51] Int. Cl.⁶ .................................................. F02M 51/00
[52] U.S. Cl. .................................. 123/480; 123/305
[58] Field of Search ........................... 123/305, 472, 123/478, 480, 486, 488, 494, 339.1, 350, 362, 501

[56] References Cited

U.S. PATENT DOCUMENTS

| | | | |
|---|---|---|---|
| 4,821,698 | 4/1989 | Atago et al. | 123/478 |
| 5,105,788 | 4/1992 | Engel | 123/501 |
| 5,211,150 | 5/1993 | Anzai | 123/480 |
| 5,359,519 | 10/1994 | Jehanno | 364/431.05 |
| 5,390,641 | 2/1995 | Yamada et al. | 123/491 |
| 5,495,841 | 3/1996 | Gillbrand et al. | 123/492 |
| 5,605,136 | 2/1997 | Nakashima | 123/480 |

*Primary Examiner*—Raymond A. Nelli
*Attorney, Agent, or Firm*—Jones, Day, Reavis & Pogue

[57] ABSTRACT

A method of controlling fuel injection in an internal combustion engine including a crankshaft, a fuel injector, and a control unit for outputting a signal causing a fuel injection event, with a minimum time delay between the output of the signal and initiation of the fuel injection event, the method comprising the steps of sensing crankshaft position, outputting the signal, and providing an additional time delay between the output of the signal and initiation of the fuel injection event so that the signal must be output at an earlier crankshaft position than would be necessary without the additional time delay, whereby changing crankshaft speed has a greater effect on the difference between the desired crankshaft position of the fuel injection event and the actual crankshaft position of the fuel injection event.

23 Claims, 2 Drawing Sheets

IDLE CONTROL FOR INTERNAL COMBUSTION ENGINE

BACKGROUND OF THE INVENTION

The invention relates to internal combustion engines, and more particularly to fuel-injected internal combustion engines. Still more particularly, the invention relates to controlling the fuel injection at idle speeds.

In a conventional internal combustion engine, fuel injection is initiated by a signal from an electronic control unit ("ECU") to a fuel injector. The signal takes the form of an electric DC current at some voltage (eg, 26 volts). There is necessarily a minimum time delay between the output of this signal and the beginning of the actual fuel injection event. With one known fuel injection system, the minimum time delay is four milliseconds. Because of this minimum time delay, the ECU does not control injection timing directly but must make a prediction based upon some estimate of engine speed. For example, at 6000 rpm, if the minimum time delay is 4 milliseconds (ms), then the ECU must irretrievably output the injection signal 144 crank degrees before the planned injection event. At 600 rpm, the ECU must output the injection signal 14.4 degrees before the actual injection event.

SUMMARY OF THE INVENTION

It has been observed that injection pressure, particularly under light load or idle conditions, is of the same order of magnitude as motored cylinder pressure. Because the injector has to open and inject against cylinder pressure, the quantity of fuel injected is strongly affected by injection timing, as the cylinder pressure increases as the piston approaches top dead center. If the injection timing is late, i.e., too close to top dead center, then less than the desired amount of fuel will be injected.

As mentioned above, the ECU outputs the injection signal based on an estimate of engine speed and the known minimum time delay between signal output and the actual injection event. If, for example, the engine is idling at 600 rpm, the nominal required injection timing is 15 degrees BTDC, and the minimum time delay is 4 ms, the ECU will calculate the crank angle delay as being 14.4 degrees and will output the injection signal at 29.4 degrees BTDC, or at least when the ECU estimates (based on the last crankshaft position sensed and known engine speed) that the crankshaft is at 29.4 degrees BTDC. If, however, engine speed is actually decreasing, then the injection event will be earlier than expected in crank angle terms (i.e., more than 29.4 degrees BTDC). Consequently, the cylinder pressure at the time of injection will be lower than expected and more fuel will be injected, thus acting to correct the decreasing engine speed. If, on the other hand, engine speed is actually increasing, the injection event will be later than expected and less fuel will be injected, thus acting to correct the increasing engine speed. This self-regulation of engine speed is particularly valuable under idle conditions.

A potential problem with this self-regulation of engine speed is that 14.4 degrees (the crank angle delay at 600 rpm) may not allow sufficient time for an accurate determination of engine speed trends. The invention therefore provides an additional time delay between output of the injection signal and the injection event. The additional time delay allows more time for changing engine speed to affect the actual time of the fuel injection event, resulting in a greater correction for the changing engine speed. The additional time delay is probably undesirable under engine operating conditions other than idle, although it could conceivably be employed under non-idle conditions.

More particularly, the invention provides a method of controlling fuel injection in an internal combustion engine including a crankshaft, a fuel injector, and a control unit for outputting a signal causing a fuel injection event, with a minimum time delay between the output of the signal and initiation of the fuel injection event, the method comprising the steps of sensing crankshaft position, outputting the signal, and providing an additional time delay between the output of the signal and initiation of the fuel injection event so that the signal must be output at an earlier crankshaft position than would be necessary without the additional time delay, whereby changing crankshaft speed has a greater effect on the difference between the desired crankshaft position of the fuel injection event and the actual crankshaft position of the fuel injection event.

The invention also provides an internal combustion engine comprising a cylinder, a piston reciprocable in the cylinder, a crankshaft driven by the piston, a fuel injector for injecting fuel into the cylinder, and an control unit for sensing crankshaft position and for outputting a signal causing a fuel injection event, with a minimum time delay between the output of the signal and initiation of the fuel injection event, the control unit providing an additional time delay between the output of the signal and initiation of the fuel injection event.

In one embodiment of the invention, the control unit senses crankshaft speed and calculates the crankshaft position at which to output the signal based on sensed crankshaft speed.

In another embodiment of the invention, the control unit calculates the crankshaft position at which to output the signal based on a predetermined crankshaft speed or speed setpoint. The setpoint can be, for example, approximately 600 rpm. Regardless of whether engine speed is increasing or decreasing, if it deviates from the setpoint, a fueling correction is very rapidly applied.

Such a strategy has a number of advantages over the alternative closed loop control strategies that are well known and are implemented entirely in ECU software. With the preferred fuel injection system, the prior strategies would use either current or duration to correct fueling, whereas with the proposed strategy these parameters are constant and fueling rate is controlled by injection timing. Absence of need for closed loop control may permit a simplified, possibly even non-microprocessor-based, ECU. The system of the invention may affect injector imbalance (either positively or negatively) and could potentially compensate for imbalanced injectors. The problem of injector matching appears to be greatest under idle conditions. The system of the invention addresses this problem in two ways. First, a combination of current and duration giving minimum variability can be established. These parameters would not need to change to control idle speed. Second, a new technique, requiring no mechanical adjustment and effective at idle only would be to use injection timing offsets on individual cylinders.

Other features and advantages of the invention will become apparent to those skilled in the art upon review of the following detailed description, claims and drawings.

Figure 1:
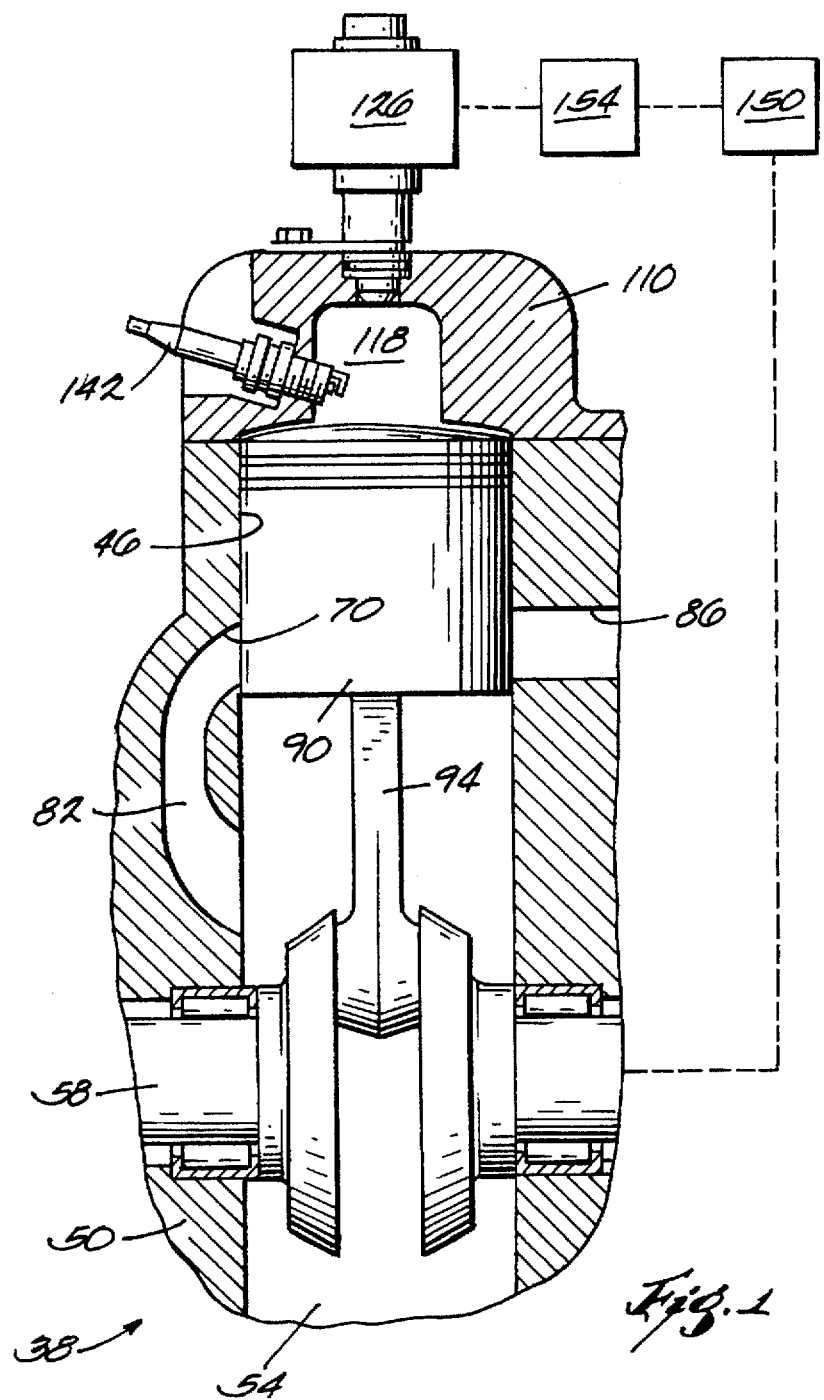
FIG. 1 is a schematic view of an internal combustion engine embodying the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

A fuel-injected, two-stroke internal combustion engine 38 embodying the invention is partially illustrated in FIG. 1. The engine 38 can have any number of cylinders, although only one cylinder 46 is shown. While the illustrated engine is a two-stroke engine, it should be understood that the invention is applicable to other types of fuel-injected engines. Except for any differences described below, the engine 38 is identical to the engine disclosed in U.S. Ser. No. 60/020,257, filed Jun. 21, 1996 and titled "Fuel-injected internal Combustion Engine" (Attorney Docket No. 72012/7850), which is incorporated herein by reference.

The engine 38 includes a crankcase 50 defining a crankcase chamber 54 and having a crankshaft 58 rotatable therein. An intake port 70 communicates with the cylinder 46 and communicates with the crankcase chamber 54 via a transfer passage 82. An exhaust port 86 communicates with the cylinder 46. The engine 38 also includes a piston 90 reciprocally moveable in the cylinder 46. The piston 90 is drivingly connected to the crankshaft 58 by a connecting rod 94. The engine 38 also includes a cylinder head 110 closing the upper end of the cylinder 46 so as to define a combustion chamber 118.

The engine 38 also includes a fuel injector 126 mounted on the cylinder head 110 for injecting fuel into the combustion chamber 118. The preferred fuel injector 126 is disclosed in U.S. Ser. No. 506,534, filed Jul. 25, 1995 and titled "Combined Pressure Surge Fuel Pump and Nozzle Assembly" (Attorney Docket No. 72012/7290), and in U.S. Ser. No. 60/020,241, filed Jun. 21, 1996 and titled "Valve Seat and Head Construction" (Attorney Docket No. 72012/7830), both of which are incorporated herein by reference. A spark plug 142 is mounted on the cylinder head 110 and extends into the combustion chamber 118, as is known in the art.

The engine also comprises a crankshaft position sensor 150 (shown schematically) operably connected to the crankshaft 58 as indicated by dotted lines in FIG. 1. Any suitable position sensor can be employed. The sensor 150 preferably senses crankshaft position every sixty degrees and outputs a corresponding signal to an electronic control unit (ECU) 154 (shown schematically). Any suitable ECU can be employed. The ECU 154 is in turn operably connected to the fuel injector 126, and the ECU 154 outputs to the fuel injector 126 a signal causing a fuel injection event. In the preferred embodiment of the invention, the signal output causes an electric DC current to be applied to the fuel injector 126, and the current causes the fuel injection event. There is, in the preferred embodiment of the invention, a 4 ms minimum time delay between output of the signal and initiation of the fuel injection event. Other embodiments could have different minimum time delays. When the engine 38 is operating under idle conditions, the ECU 154 adds to the minimum time delay an additional time delay between the output of the signal and initiation of the fuel injection event. The additional time delay delays the application of the current to the fuel injector 126. In the preferred embodiment of the invention, the additional time delay is approximately 40 ms. Other embodiments could have different additional time delays.

Figure 2:
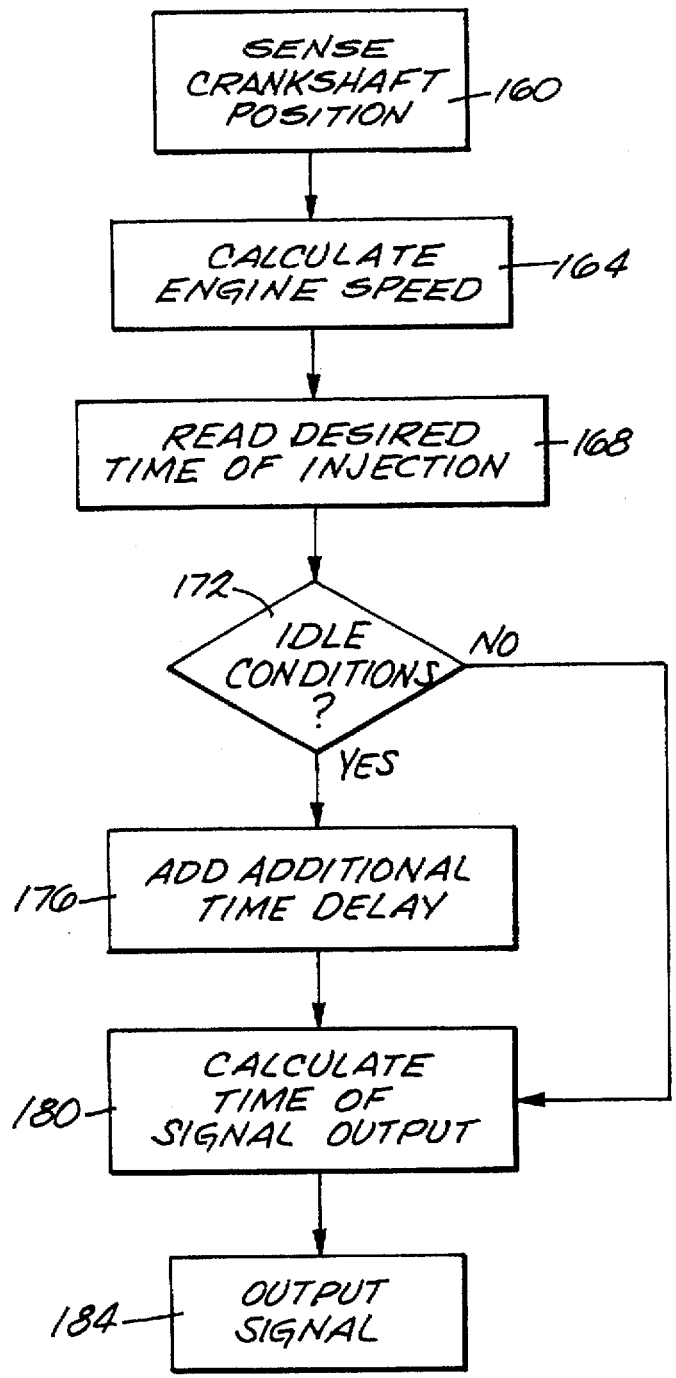
FIG. 2 is a flow chart showing the operation of the engine's electronic control unit.

The ECU 154 operates as follows. Referring to FIG. 2, the ECU 154 continuously senses crankshaft position (Step 160). At an appropriate time during each engine cycle, the ECU 154 calculates engine speed or crankshaft rpm (Step 164) and reads a map (Step 168) to determine the desired time of injection (in degrees BTDC) for the calculated engine speed. The desired time of injection can also be based on other engine conditions, such as, for example, engine load. The ECU 154 then determines whether the engine 38 is operating under idle conditions (Step 172). If the engine 38 is idling, the ECU 154 proceeds to Step 176, adds the additional time delay to the minimum time delay, and proceeds to Step 180. If at Step 172 the engine 38 is not idling, the ECU 154 skips Step 176 and proceeds to Step 180. At Step 180, knowing the desired time of injection, crankshaft speed and the total time delay between signal output and initiation of fuel injection, the ECU 154 calculates the time of signal output or crankshaft position in degrees BTDC to achieve the desired time of injection. Then, at Step 184, the ECU 154 outputs the signal at the calculated time of signal output.

Following is an example of such operation. At 600 rpm, which is determined at Step 164, the ECU 154 reads a map (Step 168) and determines that the desired time of injection is 15 degrees BTDC. Because the engine 38 is idling, which is determined at Step 172, the ECU 154 proceeds to Step 176 and adds the additional time delay of 40 ms to the minimum time delay of 4 ms. The ECU then calculates (Step 180) the time of signal output based on engine speed, desired time of injection and total time delay (44 ms). In this case the time of signal output is 173.4 degrees BTDC. The ECU outputs the signal at Step 184.

The additional time delay between the output of the signal and initiation of the fuel injection event requires the signal to be output at an earlier crankshaft position than would be necessary without the additional time delay, so that changing crankshaft speed has a greater effect on the difference between the desired time or crankshaft position of the fuel injection event and the actual time or crankshaft position of the fuel injection event. The result is, as described above, a correction of the changing crankshaft speed.

In an alternative embodiment of the invention, the ECU 154, in determining the time of signal output at Step 180, uses a predetermined crankshaft speed or speed setpoint rather than using sensed crankshaft speed. The speed setpoint can be, for example, 600 rpm.

Various features of the invention are set forth in the following claims.

I claim:

1. A method of controlling fuel injection in an internal combustion engine including a crankshaft, a fuel injector, and a control unit for outputting a signal causing a fuel injection event, with a minimum time delay between the output of the signal and initiation of the fuel injection event, said method comprising the steps of sensing crankshaft position, outputting the signal, and providing an additional time delay between the output of the signal and initiation of the fuel injection event so that the signal must be output at an earlier crankshaft position than would be necessary without the additional time delay, whereby changing crankshaft speed has a greater effect on the difference between the desired crankshaft position of the fuel injection event and the actual crankshaft position of the fuel injection event.

2. A method as set forth in claim 1 wherein the output of the signal causes a current to be applied to the fuel injector, which current causes the fuel injection event, so that the additional time delay delays the application of the current to the fuel injector.

3. A method as set forth in claim 1 wherein the engine is a two-cycle engine.

4. A method as set forth in claim 1 wherein the additional time delay is provided only at idle.

5. A method as set forth in claim 1 wherein the additional time delay is approximately 40 milliseconds.

6. A method as set forth in claim 1 wherein the control unit senses crankshaft position every 60 degrees of rotation.

7. A method as set forth in claim 1 wherein the minimum time delay is approximately 4 milliseconds.

8. A method as set forth in claim 1 wherein the control unit senses crankshaft speed and calculates the crankshaft position at which to output the signal based on sensed crankshaft speed.

9. A method as set forth in claim 1 wherein the control unit calculates the crankshaft position at which to output the signal based on a predetermined crankshaft speed.

10. A method as set forth in claim 9 wherein the predetermined crankshaft speed is approximately 600 rpm.

11. An internal combustion engine comprising a cylinder, a piston reciprocable in the cylinder, a crankshaft driven by the piston, a fuel injector for injecting fuel into the cylinder, and an control unit for sensing crankshaft position and for outputting a signal causing a fuel injection event, with a minimum time delay between the output of the signal and initiation of the fuel injection event, the control unit providing an additional time delay between the output of the signal and initiation of the fuel injection event.

12. An engine as set forth in claim 11 wherein the output of the signal causes a current to be applied to the fuel injector, which current causes the fuel injection event, so that the additional time delay delays the application of the current to the fuel injector.

13. An engine as set forth in claim 11 wherein the engine is a two-cycle engine.

14. An engine as set forth in claim 11 wherein the additional time delay is provided only at idle.

15. An engine as set forth in claim 11 wherein the additional time delay is approximately 40 milliseconds.

16. An engine as set forth in claim 11 wherein the control unit senses crankshaft position every 60 degrees of rotation.

17. An engine as set forth in claim 11 wherein the minimum time delay is approximately 4 milliseconds.

18. An engine as set forth in claim 11 wherein the control unit senses crankshaft speed and calculates the crankshaft position at which to output the signal based on sensed crankshaft speed.

19. An engine as set forth in claim 11 wherein the control unit calculates the crankshaft position at which to output the signal based on a predetermined crankshaft speed.

20. An engine as set forth in claim 19 wherein the predetermined crankshaft speed is approximately 600 rpm.

21. A method of controlling fuel injection at idle speeds in a two-cycle internal combustion engine including a crankshaft, a fuel injector, and a control unit for outputting a signal causing a current to be applied to the fuel injector, which current causes a fuel injection event, with a minimum time delay between the output of the signal and initiation of the fuel injection event, said method comprising the steps of sensing crankshaft position, outputting the signal, and providing an additional time delay between the output of the signal and initiation of the fuel injection event, so that the additional time delay delays the application of the current to the fuel injector, so that the signal must be output at an earlier crankshaft position than would be necessary without the additional time delay, whereby changing crankshaft speed has a greater effect on the difference between the desired crankshaft position of the fuel injection event and the actual crankshaft position of the fuel injection event.

22. A method as set forth in claim 21 wherein the control unit senses crankshaft speed and calculates the crankshaft position at which to output the signal based on sensed crankshaft speed.

23. A method as set forth in claim 21 wherein the control unit calculates the crankshaft position at which to output the signal based on a predetermined crankshaft speed.

* * * * *